(12) United States Patent
Magallanes et al.

(10) Patent No.: US 6,884,884 B2
(45) Date of Patent: Apr. 26, 2005

(54) GALACTOMANNAN COMPOSITIONS AND METHODS FOR MAKING AND USING SAME

(75) Inventors: Jesse Magallanes, Vernon, TX (US); Sylvain Diguet, Neuwiller (FR); William Stivers, Wrightstown, NJ (US)

(73) Assignee: Rhodia, Inc., Cranbury, NJ (US)

( * ) Notice: Subject to any disclaimer, the term of this patent is extended or adjusted under 35 U.S.C. 154(b) by 56 days.

(21) Appl. No.: 10/170,113

(22) Filed: Jun. 10, 2002

(65) Prior Publication Data

US 2003/0045708 A1 Mar. 6, 2003

Related U.S. Application Data

(60) Provisional application No. 60/297,345, filed on Jun. 11, 2001.

(51) Int. Cl.$^7$ .................. C07B 37/00; C07H 17/04; C07H 1/00
(52) U.S. Cl. ............... 536/114; 536/123; 536/123.1; 536/124; 536/128; 536/88; 507/211; 507/241; 426/573; 166/281; 166/308.5; 435/101; 524/55
(58) Field of Search .................. 536/123, 123.1, 536/114, 124, 128, 88; 507/211, 241; 426/573; 166/281, 308.5; 435/101; 524/55

(56) References Cited

U.S. PATENT DOCUMENTS

| | | | |
|---|---|---|---|
| 2,112,116 A | 3/1938 | Richter | 260/101 |
| 2,295,067 A | 9/1942 | Williams | 252/8.5 |
| 2,483,936 A | 10/1949 | Roberts | 252/8.5 |
| 2,512,338 A | 6/1950 | Klug | 260/231 |
| 2,767,167 A | 10/1956 | Opie et al. | 260/209 |
| 3,297,604 A | 1/1967 | Germino | 260/17.4 |
| 3,344,743 A | 10/1967 | Griffith | 102/23 |
| 3,391,135 A | 7/1968 | Ouno et al. | 260/214 |

(Continued)

FOREIGN PATENT DOCUMENTS

| | | | |
|---|---|---|---|
| CA | 839258 | 4/1970 | |
| DE | 33 47 469 A1 | 7/1985 | ........... C08B/37/00 |
| DE | 41 37 237 A1 | 5/1993 | ........... C08B/37/00 |
| EP | 030443 | 6/1981 | |
| EP | 0219281 | 4/1987 | |
| EP | 0447972 | 9/1991 | |
| EP | 0449594 | 10/1991 | |
| EP | 0602 991 A1 | 6/1994 | ......... A23L/1/0526 |
| EP | 1008306 | 6/2000 | |
| FR | 2 811 667 A1 | 1/2002 | ........... C08B/37/00 |
| GB | 1139637 | 1/1969 | |
| WO | WO 90/02807 | 3/1990 | |
| WO | WO 93/15116 | 8/1993 | |
| WO | WO 98/56828 | 12/1998 | |
| WO | WO 99/03058 | 1/1999 | |
| WO | WO 99/04027 | 1/1999 | |
| WO | WO 99/33879 | 7/1999 | |
| WO | WO 99/50201 | 10/1999 | |
| WO | WO 01/07485 A | 2/2001 | |

OTHER PUBLICATIONS

R. Lapasin et al., "Rheology of Hydroxyethyl Guar Gum Derivatives" *Carbohydrate Polymers*, 14, 411–427 (1991).

H. Prabhanjan et al., "Guar Gum Derivatives. Part I: Preparation and Properties" *Carbohydrate Polymers*, 11, 279–292 (1989).

(Continued)

*Primary Examiner*—James O. Wilson
*Assistant Examiner*—Devesh Khare
(74) *Attorney, Agent, or Firm*—Fish & Neave IP Group Ropes & Gray LLP; Eric C. Woglom; Wendy A. Petka

(57) ABSTRACT

The present invention relates to a method for depolymerizing galactomannan and derivatives thereof. The present invention relates to compositions comprising galactomannan and derivatives thereof prepared according to the methods of this invention and uses for the compositions. The present invention also relates to compositions comprising hydroxypropylgalactomannan having a specific polydispersity index, weight average molecular weight and viscosity in solution.

19 Claims, 1 Drawing Sheet

U.S. PATENT DOCUMENTS

| | | | | |
|---|---|---|---|---|
| 3,582,411 | A | 6/1971 | Brockbank et al. | 149/2 |
| 3,622,408 | A | 11/1971 | Lyerly | 149/109 |
| 3,728,331 | A | 4/1973 | Savage | 260/231 |
| 3,734,873 | A | 5/1973 | Anderson et al. | 260/29.6 |
| 3,890,171 | A | 6/1975 | Jessop | 149/19.1 |
| 3,922,173 | A | 11/1975 | Misak | 106/194 |
| 3,985,651 | A | 10/1976 | Newman | 210/54 |
| 4,118,355 | A | 10/1978 | Vorchheimer | 260/29.6 |
| 4,312,675 | A | 1/1982 | Pickens et al. | 106/171 |
| 4,316,982 | A | 2/1982 | Holst et al. | 536/88 |
| 4,320,226 | A | 3/1982 | Tiefenthaler et al. | 536/114 |
| 4,464,268 | A | 8/1984 | Schievelbein | 252/8.55 |
| 4,466,980 | A | 8/1984 | Tanaka et al. | 424/305 |
| 4,591,443 | A | 5/1986 | Brown et al. | 210/747 |
| 4,682,654 | A | 7/1987 | Carter et al. | 166/308 |
| 4,687,663 | A | 8/1987 | Schaeffer | 424/52 |
| 4,693,982 | A | 9/1987 | Carter et al. | 435/274 |
| 4,753,659 | A * | 6/1988 | Bayerlein et al. | 8/561 |
| 4,772,646 | A | 9/1988 | Harms et al. | 524/27 |
| 4,816,078 | A | 3/1989 | Schiweck et al. | 127/36 |
| 4,838,944 | A | 6/1989 | Kruger | 127/71 |
| 4,854,333 | A | 8/1989 | Inman et al. | 132/209 |
| 4,870,167 | A | 9/1989 | Zody et al. | 536/114 |
| 4,874,854 | A | 10/1989 | Colgrove et al. | 536/114 |
| 4,894,448 | A | 1/1990 | Pelzer | 536/84 |
| 4,915,174 | A | 4/1990 | Berrod | 166/305.1 |
| 5,051,252 | A | 9/1991 | Schultz et al. | 424/71 |
| 5,055,111 | A | 10/1991 | Bomba | 8/561 |
| 5,055,209 | A | 10/1991 | Bridges et al. | 252/8.51 |
| 5,080,717 | A | 1/1992 | Young | 106/197.1 |
| 5,093,485 | A | 3/1992 | Svensson | 536/1.1 |
| 5,179,083 | A | 1/1993 | Zody et al. | 514/54 |
| 5,190,374 | A | 3/1993 | Harms et al. | 366/165 |
| 5,250,306 | A | 10/1993 | McCleary et al. | 426/52 |
| 5,362,312 | A | 11/1994 | Skaggs et al. | 106/189 |
| 5,382,411 | A | 1/1995 | Allen | 422/131 |
| 5,421,412 | A | 6/1995 | Kelly et al. | 166/300 |
| 5,422,134 | A | 6/1995 | Hart et al. | 426/573 |
| 5,426,137 | A | 6/1995 | Allen | 523/318 |
| 5,480,984 | A * | 1/1996 | Angerer et al. | 536/88 |
| 5,569,483 | A | 10/1996 | Timonen et al. | 426/658 |
| 5,614,475 | A | 3/1997 | Moorhouse et al. | 507/273 |
| 5,708,162 | A | 1/1998 | Hilbig et al. | 536/124 |
| 5,725,648 | A | 3/1998 | Brown et al. | 106/162.8 |
| 5,747,658 | A | 5/1998 | Veelaert et al. | 536/18.5 |
| 5,811,148 | A | 9/1998 | Chiu et al. | 426/548 |
| 5,869,435 | A | 2/1999 | Kelly et al. | 507/211 |
| 5,872,246 | A | 2/1999 | Commander et al. | 536/124 |
| 5,906,962 | A | 5/1999 | Pallas et al. | 504/116 |
| 5,969,012 | A | 10/1999 | Harris | 524/55 |
| 6,017,855 | A | 1/2000 | Dawson et al. | 507/209 |
| 6,022,717 | A | 2/2000 | Brady et al. | 435/101 |
| 6,054,511 | A | 4/2000 | Angerer et al. | 524/42 |
| 6,124,124 | A | 9/2000 | Brady et al. | 435/190 |
| 6,138,760 | A | 10/2000 | Lopez et al. | 166/300 |
| 6,179,962 | B1 | 1/2001 | Brady et al. | 162/164.1 |
| 6,197,730 | B1 | 3/2001 | Kelly et al. | 507/211 |

OTHER PUBLICATIONS

B.E. Christensen et al., "Degradation of Double–Stranded Xanthan by Hydrogen Peroxide in the Presence of Ferrous Ions: Comparison to Acid Hydrolysis" *Carbohydrate Research*, 280, pp. 85–99 (1996).

D. Craig et al., "The Degradation of Hydroxypropyl Guar Fracturing Fluids by Enzyme, Oxidative, and Catalyzed Oxidative Breakers" *Proceedings of the Thirty–Ninth Annual Southwestern Petroleum Short Course*, Southwestern Petroleum Short COurse Association, Inc., Texas Tech University, Lubbock, Texas, pp. 1–19 (1992).

E. Frollini et al., "Polyelectrolytes from Polysaccharides: Selective Oxidation of Guar Gum—a Revisited Reaction" *Carbohydrate Polymers*, 27, pp. 129–135 (1995).

B.L. Gall and C.J. Raible, "Molecular Size Studies of Degraded Fracturing Fluid Polymers" *Proceedings: 1985 SPE International Symposium on Oilfield and Geothermal Chemistry*, SPE 13566, Apr. 9–11, pp. 167–178 (1985).

T. Ouchi et al., "Synthesis and Cytotoxic Activity of Oxidized Galactomannan/ADR Conjugate" *J.M.S. Pure Appl. Chem.*, A34(6), pp. 975–989 (1997).

A. Tayal et al., "Degradation of a Water–Soluble Polymer: Molecular Weight Changes and Chain Scission Characteristics" *Macromolecules*, 33, pp. 9488–9493 (2000).

A. Tayal et al., "Rheology and Microstructural Changes during Enzymatic Degradation of a Guar–Borax Hydrogel" *Macromolecules*, 32, pp. 5567–5574 (1999).

B.R. Vijayendran and T. Bone, "Absolute Molecular Weight and Molecular Weight Distribution of Guar by Size Exclusion Chromatography and Low–angle Laser LIght Scattering" *Carbohydrate Polymers*, 4, pp. 299–313 (1984).

* cited by examiner

GALACTOMANNAN COMPOSITIONS AND METHODS FOR MAKING AND USING SAME

FIELD OF THE INVENTION

The present invention relates to methods for depolymerizing galactomannan and derivatives thereof, particularly hydroxypropylgalactomannan. The invention relates also to compositions made by these methods, to compositions comprising depolymerized galactomannan and derivatives thereof, and to uses for the compositions.

BACKGROUND OF THE INVENTION

Galactomannans are a class of polysaccharides composed of galactose and mannose. In general, the structure of the polymers consist of a linear chain of 1,4-linked beta D-mannopyranosyl units with single-membered alpha-D-galactopyranosyl units joined by 1,6 linkages. Galactomannans vary in the extent and uniformity of substitution with respect to their galactose moieties. For example, the two sources of galactomannans are guar and locust bean gums. Galactomannan from guar has a galactose:mannose ratio of approximately 1:2. Galactomannan from locust bean gum has a galactose:mannose ratio of approximately 1:4.

There are three major components of a guar seed, i.e., the seed coat, the endosperm, and the germ. The endosperm contains most of the galactomannan of the seed and consists mainly of galactomannan. In addition to the galactomannan, the endosperm of guar seeds may contain protein (5–7% wt) and small amounts of zinc, lead and copper. During preparation of the galactomannan, some small amount of hull material comprising cellulose from the endosperm may be processed with the galactomannan. In its natural state, the weight average molecular weight of guar galactomannan is typically in the millions.

Galactomannan in its natural state, such as from guar seeds, may have a low molecular weight distribution. The polydispersity index is one measure of molecular weight distribution. Galactomannan in its natural state may be depolymerized to generate shorter length galactomannan polymers. These shorter polymers have a lower weight average molecular weight but tend to have a high polydispersity index. Several studies purport to describe methods for making depolymerized polysaccharides, including galactomannan, and the resulting depolymerized compositions [U.S. Pat. No. 3,728,331 (Savage); U.S. Pat. No. 4,874,854 (Colegrove); U.S. Pat. No. 5,708,162 (Hilbig); U.S. Pat. No. 4,753,659 (Bayerlein); EP 030443A; WO 93/15116; Craig, D., et al. (1992) *Proceedings of the Thirty-Ninth Annual Southwestern Petroleum Short Course*, Southwestern Petroleum Short Course Association, Inc., Apr. 22–23, 1992, Texas Tech University, Lubbock, Texas; Vijayendran and Bone, (1994) Carbohydrate Polymers 4:299–313; Frollini, E. et al., (1995) *Carbohydrate Polymers* 27:129–135; Ouchi, T., et al. (1997) *J.M.S.—Pure Appl. Chem.* A34(6):975–989; Tayal, A., et a., (2000) *Macromolecules* 33:9488–9484].

None of these patents or publications provides a description of a hydroxypropylgalactomannan composition having the polydispersity index, weight average molecular weight ($M_w$) and viscosity of the hydroxypropylgalactomannans of the present invention. Further, none these publications provides a method for preparing a composition comprising depolymerized galactomarman according to the present application. Nor do those publications describe the particular benefits of using these compositions in treating and/or making fractures in a subterranean formation such as a well.

One object of this invention is to provide an efficient, high-yield, cost effective method for manufacturing a galactomannan composition. Another object of this invention is to provide a method for manufacturing a galactomannan composition that requires less caustic material and reduces the amount of waste generated during manufacture. Yet, another object of this invention is to provide a method for making a composition comprising galactomannan having a certain molecular weight, polydispersity index and viscosity, which is useful, e.g., in treating or making a fracture in a subterranean formation. In one preferred embodiment, the compositions of this invention are useful as a component of a hydraulic fracturing fluid.

One object of this invention is to provide a galactomannan composition that has the combination of advantages of rendering a subterranean formation treatment fluid, such as a fracturing fluid, highly viscous to carry proppant efficaciously yet sufficiently flowable to fill a subterranean fracture. Additionally, an object of this invention is to provide a galactomannan composition that is useful in making an improved fluid for treating a subterranean formation, wherein the fluid has high conductivity or movement through a proppant pack, improved regained formation permeability and lower dynamic fluid loss. Yet another object of this invention is to provide a galactomannan composition that hydrates uniformly and quickly. Further, other objects of this invention include providing a galactomannan composition useful for making an improved subterranean formation treatment fluid that does not require the use of breakers.

Other objects of this invention include providing improved hydroxypropylgalactomannan compositions for use, e.g., in the manufacture of cosmetics, foodstuffs, drugs, paper, tobacco products or explosives or for use in printing or dyeing textiles, mining, or water treatment.

SUMMARY OF THE INVENTION

The present invention provides a method for depolymerizing galactomannan and derivatives thereof comprising the steps of spraying substantially dry galactomannan or a derivative thereof with a liquid cleaving agent and mixing the galactomannan or a derivative thereof and the cleaving agent, wherein the galactomannan or derivative thereof is the major solid component by weight in the mixing step and the moisture content of the mixture during the mixing step is not more than 25% of the weight of the dry galactomannan or derivative thereof. The present invention also provides a method for depolymerizing galactomannan and derivatives thereof comprising the steps of uniformly contacting substantially dry galactomannan or derivative thereof with a hydrogen peroxide solution; and mixing the galactomannan or derivative thereof and the hydrogen peroxide solution, wherein the galactomannan or derivative thereof is the major solid component by weight in the mixing step and the moisture content of the mixture during the mixing step is not more than 25% of the weight of the dry galactomannan or derivative thereof. According to one embodiment of the invention, the substantially dry galactomannan is ground, dried endosperm of a seed containing galactomannan such that the composition comprising the galactomannan or derivatized galactomannan may additionally comprise substantial amounts of other components from the endosperm of the seed. The galactomannan can be depolymerized according to the methods of this invention such that the depolymerized galactomannan has a specific weight average molecular weight, polydispersity index and viscosity in solution.

The present invention provides a composition comprising hydroxypropylgalactomannan, wherein the hydroxypropylgalactomannan has a weight average molecular weight of approximately 75,000 to 500,000 and a polydispersity index (PDI) in the range of 1–8. According to one embodiment of the invention, the hydroxypropyl guar has a 0.1–0.8 molar substitution. According to a further embodiment of the invention, the hydroxypropanyl guar has a 0.2–0.8 molar substitution (m.s.). In a further embodiment, the compositions according to this invention exhibit a specific viscosity as a 2.5% solution. In yet another embodiment, the compositions of this invention further comprise substantially all of the solid components of an endosperm from which the galactomannan was obtained. The present invention also provides compositions made according to the methods of this invention.

The present invention also provides for the use of the compositions according to this invention in the manufacture of cosmetics, foodstuffs, drugs, paper, tobacco products or explosives, or in the printing or dyeing of textiles, mining, or treating water.

DETAILED DESCRIPTION

Figure 1:
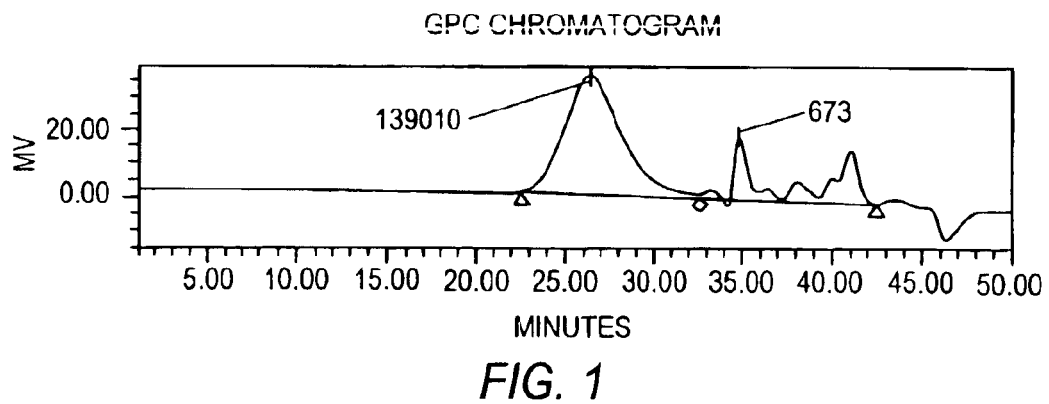
FIG. 1 is a gel permeation chromatogram of depolymerized HPG (Lot 293 H).

Galactomannan according to this invention includes galactomannan derived from a source selected from the group consisting of the endosperm of guar seed, locust bean, tara kernel, and cassia toria seed. Galactomannan according to this invention may be underivatized or derivatized. Derivatized galactomannan according to this invention includes hydroxypropylguar (HPG), carboxymethylguar (CMG), hydroxyethyl guar (HEG), carboxymethylhydroxypropyl guar (CMHPG), hydroxybutyl guar (HBG), cationic guar, hydrophobically modified guar (HMG), hydrophobically modified carboxymethylguar (HMCMG), hydrophobically modified hydroxyethylguar (MHG), hydrophobically modified hydroxypropylguar (HMHPG), hydrophobically modified carboxymethylhydroxypropylguar (HMCMHPG), hydrophobically modified hydroxybutyl guar (HMHBG), and hydrophobically modified cationic guar (HMCG). According to one preferred embodiment of the invention, the derivatized guar is HPG. According to an embodiment of the invention, the derivatized galactomannan has a molar substitution or a degree of substitution in the range of 0.01–0.8 or 0.2–0.6. According to a preferred embodiment of the invention, the derivatized HPG has a molar substitution in the range of 0.01–0.8 or 0.2–0.6.

The term "degree of substitution" (d.s.) refers to the average number of sites that are substituted with a functional group (e.g., hydroxypropyl) per anhydro sugar unit in the galactomannan. In guar galactomannan, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxyl sites have been esterified with functional groups.

The term "molar substitution" (m.s.) refers to the average number of moles of functional groups (e.g., hydroxypropyl) per anhydro sugar unit in the galactomannan.

The weight average molecular weight of the galactomannan or derivative thereof according to this invention is in the range selected from the group consisting of 75,000–500,000; 75,000–225,000; 75,000–250,000; 100,000–500,000; 100,000–250,000; 100,000–225,000; 150,000–500,000; 150,000–250,000 and 150,000–225,000. According to one preferred embodiment, the range is between 150,000–225,000. The weight average molecular weight of the galactomannan may be calculated by using GPC as illustrated in Example 3.

The galactomannan or derivative thereof in the composition according to the present invention has a polydispersity index (PDI) in the range of 1–8. According to a preferred embodiment, the PDI of the galactomannan or derivative thereof is in the range selected from the group consisting of 1–6, 1–3, 2–8, 2–6 and 2–3. The PDI of the galactomannan or derivative thereof according to this invention can be calculated by using gel permeation chromatography (GPC), e.g., as described in Example 3.

The galactomannan or derivative compositions of this invention include those compositions having a Fann 35 viscosity of 5 to 250 cP with Rotor #1 Bob 1 combination at 25° C. and 300 rpm (511/sec) in a 2.5% solution as described in Examples 2 and 3. A 2.5% solution according to this invention refers to a 2.5% by weight solution of dry galactomannan or dry derivative thereof based on the weight of the solids in the composition that would be present minus any residual water/liquid associated with the solids. The dried material would be the solids (e.g., "dry galactomannan"). The extra weight present before drying would be due to the residual water/liquid associated with the solids. Thus, the evaporated material would be the water or moisture (water and/or organic solvent) present in the sample before drying. The viscosity of 2.5% solutions of the dry galactomannan or derivatives thereof at 25° C. can be in the range selected from the group consisting of 5–100 cP, 5–40 cP, 10–250 cP, 10–100 cP, 20–40 cP, 20–250 cP, 20–100 cP and 20–40 cP. In a preferred embodiment, the range is 10–100 cP or 20–40 cP.

According to one embodiment, it is desirable that the galactomannan be relatively dry during the depolymerization step. Accordingly, one embodiment is that the water content or moisture content of the composition does not exceed 25% of the weight of the solids. According to another embodiment, the water or moisture content of the composition will not exceed 15% of the weight of the solids in the composition. In yet another embodiment, the water or moisture content of the composition will not exceed 10% of the weight of the solids in the composition.

In an embodiment of this invention, the composition may comprise substantially all of the solid components of an endosperm from which the galactomannan or derivative thereof was obtained. This is possible because, according to one embodiment of this invention, the dry, ground endosperm is not washed during the derivatization and/or depolymerization processes for the galactomannan. Thus, components such as proteins or cellulose in the endosperm are subjected to the derivatization and/or depolymerization processes. The cellulose that may be present in the endosperm may increase the viscosity of the composition.

A composition according to this invention may further comprise one or more other polysaccharides, including galactomannan and galactomannan derivatives if not already present in the composition.

A method for making the depolymerized galactomannans or derivatives thereof according to this invention comprises the steps of (a) spraying substantially dry galactomannan or derivative thereof with a liquid cleaving agent; and (b) mixing the galactomannan or derivative thereof and the cleaving agent, wherein the galactomannan or derivative thereof is the major solid component by weight in the mixing step and the moisture content of the mixture during the mixing step is not more than 25% of the weight of the dry galactomannan or derivative thereof. Another method for making the depolymerized galactomannans or derivatives thereof according to this invention comprises the steps of: (a) uniformly contacting substantially dry galactomannan or derivative thereof with a hydrogen peroxide solution; and (b) mixing the galactomannan or derivative thereof and the hydrogen peroxide solution, wherein the galactomannan or derivative thereof is the major solid component by weight in the mixing step and the moisture content of the mixture during the mixing step is not more than 25% of the weight of the dry galactomannan or derivative thereof.

Uniform contact according to this invention means that a substantial portion of the galactomannan is simultaneously contacted with the hydrogen peroxide solution. In this regard, the uniform contact may be achieved by spraying the galactomannan with the liquid form of the hydrogen peroxide solution or by adding the galactomannan uniformly to the liquid form of the hydrogen peroxide solution. Thus, according to this invention, localized contact of the galactomannan with high concentrations of cleaving agent, which may occur if a cleaving agent is poured into the galactomannan or if a cleaving agent is added to the galactomannan in solid form, can be avoided.

The galactomannan can be derivatized prior to or after the depolymerization step. In a preferred embodiment, the galactomannan is derivatized before the depolymerization step. The derivatization method described in Example 1 using propylene oxide can be used to make HPG. Alternatively, other suitable derivatization methods known in the art may be used to derivatize the galactomannan of this invention.

A cleaving agent according to this invention is a chemical molecule that non-specifically cleaves ether bonds between mannoses in the galactomannan backbone. Accordingly, a cleaving agent includes acids such as hydrogen halides in the form of a liquid (acid hydrolysis) and oxidizing reagents (oxidative degradation), but not enzymes. Examples of oxidizing agents include peroxides, chlorates, chlorites, sulfates and nitrates. According to a preferred embodiment, the oxidizing agent is hydrogen peroxide. A composition according to the methods of this invention may have 1–5 ppm residual cleaving agent after depolymerization.

If hydrogen peroxide is used, it can be diluted, e.g., to a solution in the range of 20%–50% in water. In a preferred embodiment, the hydrogen peroxide solution is a 28%–35% solution.

According to one embodiment of this invention, the galactomannan to be treated is substantially dry. Substantially dry according to this invention generally means that the composition comprising the galactomannan to be treated with cleaving agent has less than 15% water content. In one embodiment, the galactomannan composition to be treated has less than 10% water content. Organic solvent may be present to help solubilize the galactomannan or derivatized galactomannan.

Compositions comprising galactomannan having a weight average molecular weight in the range of 100,000–500,000 and a PDI in the range of 1–8 may be prepared by uniformly contacting 70–98 parts dry galactomannan with 0.2–5.0 parts cleaving agent in the presence of 1–25 parts water (parts relative to each other by weight). In one preferred embodiment, the mixture comprises 1–10 parts water relative to the dry galactomannan and the cleaving agent. In another embodiment, the mixture comprises 75–88 parts dry galactomannan, 11–13 parts water and 0.5–3.5 parts cleaving agent. The ratios of the cleaving agent, water and dry galactomannan may be adjusted in these ranges to obtain the desired weight average molecular weight and polydispersity index.

Certain cleaving agents, such as hydrogen peroxide, are more effective at higher temperature. Therefore, the depolymerization with hydrogen peroxide may be performed at 70° F.–200° F. However, at the higher temperatures, the galactomannan may become discolored and charred, which is undesirable for e.g., the food or cosmetic industry. Therefore, the depolymerization method with hydrogen peroxide is more preferably conducted at 100° F. to 170° F.

It is preferable that the moisture content of the mixture during the mixing step of the depolymerization reaction is minimal. According to one embodiment, the moisture content of the mixture not more than 25% of the weight of the dry galactomannan when the cleaving agent is present.

The depolymerization reactions can be planned such that completion of the desired amount of depolymerization occurs when substantially all of the cleaving agent has been reacted. For example, the mixing reaction may continue until less than 3–5 ppm of the hydrogen peroxide remains. Samples from the depolymerization reaction at certain time points may be analyzed to determine the amount of unreacted cleaving reagent present. Alternatively, the depolymerization reaction may planned such that the reaction may be terminated at a particular time although substantial amounts of cleaving agent may be present. Again, samples from the depolymerization reaction at intermediate time points may be analyzed to determine the proper time to terminate the depolymerization reaction. According to a preferred embodiment, the depolymerization reaction is planned such that it continues until less than 3–5 ppm of active cleaving reagent remains.

Without being bound by theory, the combination of the ratio of dry powder, cleaving agent and water relative to each other, the uniform contact of the liquid cleaving agent to the dry powder and the low total volume of the reaction combined with constant mixing of the depolymerization reaction is believed to be important for achieving the polydispersity index for the compositions of this invention, their specified weight average weight molecular weights, viscosity and several unexpectedly beneficial properties/uses. A composition comprising galactomannan having a narrow molecular weight distribution and specified weight average molecular weight is advantageous, e.g., in subterranean fracturing wherein large, non-uniform sized galactomannan polymers can hinder the extraction of oil from a fracture.

Galactomannan compositions according to this invention are useful in making unexpectedly better fluids for treating and/or making subterranean fractures e.g., by increasing the conductivity of liquids and materials through a proppant pack, improving the regained formation permeability and lowering dynamic fluid loss as described in Examples 1–3 of United States application entitled "Subterranean Formation Treating Fluid Concentrates, Treating Fluids and Methods," filed Jun. 11, 2001 (Jim D. Weaver, Steve F. Wilson, Bobby K. Bowles, Billy F. Slabaugh, Mark A. Parker, David M.

Barrick, Stanley J. Heath, Harold Walters, R. Clay Cole) and assigned to Halliburton Energy Services, Inc., which is incorporated by reference herein.

Hydraulic fracturing is distinguishable from drilling in that it is the process of creating fractures around a well bore generated by drilling. Subterranean fractures can be generated by injecting a fluid, such as a subterrranean formation treatment fluid, into the well bore at a pressure sufficient to form fractures in the area surrounding the wellbore. When the pressure is released, the fluid as well as oil deposits may be removed from the well.

Compositions prepared according to the methods of this invention can be useful in the manufacture of cosmetics, foodstuffs, drugs, paper, tobacco products or explosives. For example, compositions of this invention can be added during the manufacture of cosmetics, foodstuffs, drugs, paper, tobacco products or explosives. The compositions can also be added while printing or dyeing textiles, mining, or treating water. [Davidson, R. L., ed., *Handbook of Water-Soluble Gums and Resins* McGraw-Hill, Inc.: New York (1980); Whistler, R. L., and J. N. BeMiller, *Industrial Gums: Polysaccharides and Their Derivatives*, 3$^{rd}$ Ed., Academic Press, Inc.:San Diego (1993), incorporated by reference].

Unless otherwise specified, all percentages and parts are by weight. Unless otherwise specified, viscosity measurements are based on a 2.5% solution (dry weight of solids, i.e., moisture corrected) using a Fann 35 viscometer at 25° C. and 20 rpm.

Throughout the specification, the word "comprise," or variations such as "comprises" or "comprising," will be understood to imply the inclusion of a stated integer or group of integers but not the exclusion of any other integer or group of integers.

While a number of embodiments of this invention have been provided, it is apparent that the basic construction can be altered to provide other embodiments which utilize the compositions and methods of this invention. Therefore, it will be appreciated that the scope of this invention can be defined by the specification rather than the specific examples which are exemplified here.

This application claims priority to U.S. Provisional Patent Application 60/297,345, filed Jun. 11, 2001, the content of which is incorporated by reference.

EXAMPLE 1

Preparing Guar Splits and Derivatization

Guar splits, obtained by removing the hulls and germ from guar seeds, were purchased from Hindustan Gum Limited, India. One hundred forty-one gallons of cold water were mixed with 280 lbs of a caustic mix (120 lbs water, 160 lbs of 50% NaOH) in a pressurized ribbon blender at 6–60 rpm. Swelling of the guar splits was accomplished by adding 2000 lbs of the guar splits to the above solution, mixing for 10 minutes, and then replacing the air in the reactor with nitrogen gas by evacuation. The reaction was cooled to less than 105° F. and the pressure in the reactor was adjusted to −8 psig.

To this mixture, 500 lbs of propylene oxide was added, mixed for 10 minutes, and then heated to 140° F. with continuous agitation in the same blender until the pressure in the blender reached 0 psig (1 atm). Nitrogen gas was added to the reaction up to +10 psig. The mixture was blended another 20 minutes and then cooled to 140° F. The reactor was vented and the mixture was discharged. The resultant hydroxypropyl guar (HPG) mixture containing the caustic and reaction by-products was then dried to a moisture content of 8–12% or less of the total weight and ground in a hammer mill to form a powder (hereinafter, "base"). Thus, the ratio of reagents in the guar swelling/derivatization reaction was 65 parts water, 100 parts guar split, 8 parts 50% caustic, and 25 parts propylene oxide.

EXAMPLE 2

Depolymerization of Hydroxypropyl Guar

The base was then transferred to a 10 K or a 20 K blender (10 K Horizontal Ribbon Mixer S5412 from S. Howes Co., Inc.) and heated to about 100° F. but generally not greater than 110° F. The starting temperature of the depolymerization reaction was typically 100 to 120° F. Depolymerization of the HPG was achieved by spraying the base with an amount of $H_2O_2$ solution, typically a 28% or 35% solution. The amount of $H_2O_2$ solution was approximately the equivalent of the amount of 100% $H_2O_2$ that approximates 0.25–5% of the weight of the total depolymeration reaction mixture. For example, a 35% $H_2O_2$ solution could be sprayed in one dose (200 lbs 35% $H_2O_2$ solution/5000 lbs base) or in two doses (100 lbs 35% $H_2O_2$ solution/5000 lbs base applied twice) with mixing in between dosing.

The temperature in the blender was allowed to heat up to 130–150° F. to react the peroxide. At 140° F., the hydrogen peroxide reacts in approximately 30 minutes. The blender was maintained between 130–150° F. degrees using steam or cooling water as needed and then cooled to 125–135° F. The reaction continued until less than 3–5 ppm of $H_2O_2$ remained. Optimally, the temperature of the depolymerization reaction was maintained below 150° F. to avoid charring and discoloration of the guar.

The $H_2O_2$ solution was dispersed through small spray nozzles (UniJet TG Full Cone Spray Nozzle Tip 3.5 capacity size or 5 capacity size for a 10K blender or a 20K blender, respectively) at between 30–60 psi.

The moisture content of the base after the depolymerization treatment ("depolymerized HPG powder" or "DHPG powder"), as determined by comparing the weight of the treated base before and after evaporation of the remaining liquid in the base, was typically 8–10%. The depolymerized HPG powder was then sifted through a mesh screen to remove larger masses of material. For example, the depolymerized HPG powder was sifted through a mesh screen having either 10, 20, 60 or 150 holes per inch (i.e., 10 mesh–150 Tyler screens) and the material that passed through the mesh was used to prepare a liquid concentrate.

The target molecular weight range for the depolymerized HPG was generally 100,000–500,000. For a quick evaluation as to whether effective depolymerization of HPG was being achieved during the depolymerization process, samples of the treated base having less than 3–5 ppm of $H_2O_2$ were diluted to 2.5% solid (moisture corrected) in an aqueous solution and the viscosity of the diluted samples were measured using a Fann 35 viscometer or Brooksfield RV viscometer. A viscosity reading of 20–100 cP for the diluted sample using a Fann 35 viscometer was usually indicative that the HPG polymers had a molecular weight range between 100,000–500,000 with a polydispersity index of less than 6. The amount of the $H_2O_2$ solution applied to the base was increased or decreased as needed to achieve a 2.5% diluted sample viscosity of 20–100 cP. The molecular weight of the depolymerized HPG was confirmed by gel permeation chromatography (GPC) as discussed below.

Table 1 provides examples of depolymerized HPG powder produced according to the conditions provided in the table. The weight of the base to be treated for each was generally 5000 lbs except for Lots #524C, 524D, 524H, 293D, 293E, 293K, 9070A, 9070C and 293S. The weight of the base to be treated for those lots was 4820 lbs, 4000 lbs, 4000 lbs, 6500 lbs, 7000 lbs, 4700 lbs, 10000 lbs, 12000 lbs and 2900 lbs, respectively. The nozzle used in was a Unijet TG Full Cone having either a 5 or a 3.5 capacity size.

TABLE I

Depolymerized HPG powder samples

| Lot # | $H_2O_2$ soln (lbs) | # of $H_2O_2$ doses | $H_2O_2$ Spray | $H_2O_2$, % of Dry wt | Nozzle Size | Spray Psi |
|---|---|---|---|---|---|---|
| 524A | 202 | 2 | 28% | 1.13 | 5 | 60 |
| 524C | 178 | 1 | 28% | 1.03 | 5 | 60 |
| 524D | 141 | 2 | 35% | 1.05 | 5 | 60 |
| 524E | 150 | 1 | 35% | 1.05 | 5 | 60 |
| 524H | 151 | 2 | 35% | 1.06 | 5 | 60 |
| 524K | 180 | 1 | 20% | 0.72 | 5 | 60 |
| 524S | 151 | 2 | 35% | 1.06 | 3.5 | 40 |
| 524T | 150 | 1 | 35% | 1.05 | 3.5 | 40 |
| 524W | 200 | 2 | 20% | 0.80 | 3.5 | 40 |
| 524Y | 220 | 2 | 20% | 0.88 | 3.5 | 30 |
| 293D | 289 | 5 | 35% | 1.56 | 3.5 | 60 |
| 293E | 375 | 6 | 35% | 1.88 | 3.5 | 60 |
| 293H | 230 | 3 | 35% | 1.65 | 3.5 | 60 |
| 293K | 240 | 3 | 35% | 1.79 | 3.5 | 28 |
| 9070A | 815 | 4 | 20% | 1.63 | | |
| 9070C | 978 | 2 | 20% | 1.63 | | |
| 293S | 95 | 3 | 35% | 2.18 | 3.5 | |

The ratio of the components of the depolymerization reaction of Table 1 relative to each other (in parts based on weight) are listed in Table 2. Table 2 also recites the viscosity of a 2.5% solution of the above depolymerized HPG powder in water as determined by using a Farm 35 viscometer with a R1 rotor B1 Bob combination at 300 rpm (511/sec) at 25° C. Additionally, Table 2 recites the average weight molecular weight and number average molecular weight of the depolymerized HPG powder as measured by using gel permeation chromatography as discussed below. The polydispersity index of each depolymerized HPG powder was calculated based on the GPC $M_w$ and $M_n$ values.

TABLE 2

| Lot # | Parts dry powder in rxn | Parts water in rxn | Parts $H_2O_2$ in rxn | cP | $M_w$ (×1000) | $M_n$ (×1000) | PDI |
|---|---|---|---|---|---|---|---|
| 524A | 86.5 | 12.4 | 1.1 | 44 | 222 | 42 | 5.32 |
| 254C | 86.8 | 12.2 | 1.0 | 57 | 254 | 46 | 5.52 |
| 524D | 86.9 | 11.9 | 1.2 | | 223 | 45 | 4.91 |
| 524E | 87.4 | 11.6 | 1.0 | 68 | 210 | 42 | 4.98 |
| 524H | 86.7 | 12.0 | 1.3 | 43 | 219 | 43 | 5.13 |
| 524K | 86.9 | 12.4 | 0.7 | | 293 | 50 | 5.86 |
| 524S | 87.4 | 11.6 | 1.0 | | 283 | 50 | 5.71 |
| 524T | 87.4 | 11.6 | 1.0 | | 306 | 47 | 6.55 |
| 524W | 86.5 | 12.7 | 0.8 | 66 | 381 | 91 | 4.18 |
| 524Y | 86.2 | 13.0 | 0.8 | 50 | 257 | 52 | 5.01 |
| 293D | 86.2 | 12.3 | 1.5 | 28 | 200 | 52 | 3.85 |
| 293E | 85.4 | 12.8 | 1.8 | 26 | 194 | 51 | 3.82 |
| 293H | 86.0 | 12.4 | 1.5 | 23 | 163 | 55 | 2.97 |
| 293K | 85.6 | 12.7 | 1.7 | 24 | 162 | 47 | 3.46 |
| 9070A | 83.2 | 15.3 | 1.5 | 80 | 400 | 80 | 5.04 |
| 9070C | 83.2 | 15.3 | 1.5 | 46 | 280 | 66 | 4.27 |
| 293S | 87.1 | 11.7 | 1.1 | 23 | 166 | 46 | 3.62 |

EXAMPLE 3

Viscosity

The viscosity of the HPG powder was periodically tested throughout the depolymerization process by preparing a 2.5% solution of the depolymerized HPG powder (moisture corrected) and testing it in a Fann 35 viscometer with Rotor 1 Bob 1 combination at 300 rpm (511/sec) and 25° C. The viscosities of the liquid concentrates of depolymerized HPG were generally measured by testing a portion of the liquid concentrate in a Brookfield RV at 20 rpm with spindle #6,7 or LV#3 (cylinder).

Gel Permeation Chromatography (GPC)

GPC was used to determine the weight average molecular weight ($M_w$), the number average molecular weight ($M_n$), molecular weight distribution (MWD) and the polydispersity index (PDI) for the depolymerized HPG polymers in the DHPG powder.

Briefly, depolymerized HPG samples were prepared by resuspending 0.0025 g–0.05 g of sample in a 20 ml scintillation vial and diluting to 10 g total with a 55 mM $Na_2SO_4$, 0.2% (w/v) $NaN_3$ solution in deionized water ("mobile phase solution"), depending on the polymer being tested. Molecular weight standards (e.g., Stachyose, 667 daltons; Meyprogat 7(guar), 58,000 daltons; CSSA 200 (guar), 2,000,000 daltons) were prepared by resuspending 0.0025 g of each into a 20 ml scintillation vial and diluting to 10 g total with the mobile phase solution. Each resuspended sample and standard were filtered using 0.45 uM PVDF filters into autosampler vials.

Two hundred microliters of each filtered solution were injected into a Waters 717 Plus Autosampler equipped with the following columns in series: Supelco Progel-TSK G3000 $PW_{XL}$, G6000 $PW_{XL}$, and Progel-TSK $PW_{XL}$ guard column. The GPC machine was set at a flow rate of 0.6 ml/min for 50 minutes. The peaks were detected using a Waters 410 Refractive Index, 64×sensitivity.

The molecular weights of the samples at each point in their chromatograms were calculated using a linear least squares fit of log MW versus retention time. The correlation coefficient was 0.995 or higher. The baseline points for the polymer peaks in the sample chromatograms were used to calculate molecular weight averages (i.e., starting and ending points). The equations used were $M_n = h_i/(h_i/M_i)$ and $M_w = (h_i M_i)/h_i$, wherein $h_i$ is the GPC curve height at the ith time increment and $M_i$ is the molecular weight of the species eluted at the ith retention time. The polydispersity ratio $M_w/M_n$ was calculated by dividing $M_w$ by $M_n$.

Figure 2:
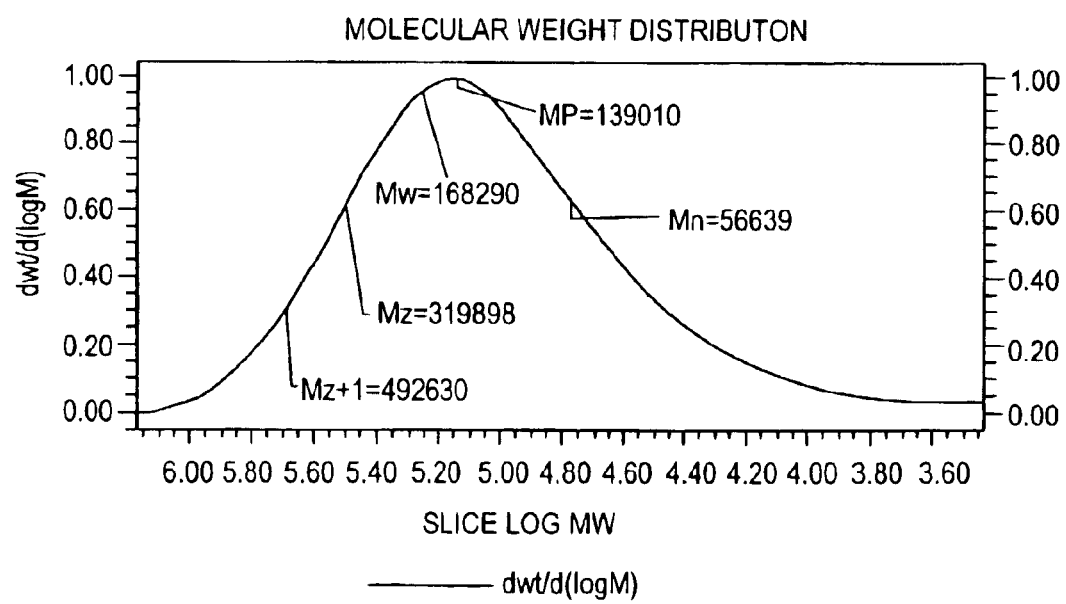
FIG. 2 is a graphic depiction of the molecular weight distribution of depolymerized HPG (Lot 293H).

FIG. 1 is a GPC chromatogram of the depolymerized HPG powder described in designated as Lot 293H in Table 1. The chromatogram depicts the elution of two groups of polymers in the DHPG powder at approximately 27 minute (approximate peak 139,010 mol. wt.) and 35 minutes (approximate peak 673 mol. wt.). The peak at 27 minutes is a result of the elution of the DHPG polymer and the peak at 35 minutes is the result of solvent/salt interference. FIG. 2 depicts the molecular weight distribution of the 27 minutes peak in FIG. 1. The GPC results show that the group of polymers that eluted at 27 minutes on the chromatogram had a $M_w$ of 168,290, a $M_n$ of 56,639 and a polydispersity index of 2.97.

We claim:

1. A method for depolymerizing galactomannan or derivatized galactomannan comprising the steps of:

(a) spraying substantially dry galactomannan or derivatized galactomannan with a liquid cleaving agent, wherein said substantially dry galactomannan or derivatized galactomannan has less than 15% water content by weight; and (b) mixing the galactomannan or derivatized galactomannan and the cleaving agent, wherein the galactomannan or derivatized galactomannan is the major solid component by weight in the mixing step and the moisture content of the mixture during the mixing step is not more than 15% of the weight of the dry galactomannan or derivatized galactomannan, wherein said derivatized galactomannan is selected from the group consisting of hydroxypropylguar (HPG), carboxymethylguar (CMG) hydroxyethyl guar (HEG), carboxymethylhydroxypropyl guar (CMHPG), hydroxybutyl guar (HBG), cationic guar, hydrophobically modified guar (HMG), hydrophobically modified carboxymethylguar (HMCMG), hydrophobically modified hydroxyethylguar (HMHEG), hydrophobically modified hydroxypropylguar (HMHPG), hydrophobically modified carboxymethylhydroxypropylguar (HMCMHPG), hydrophobically modified hydroxybutyl guar (HMHBG), and hydrophobically modified cationic guar (HMCG).

2. A method for depolymerizing galactomannan or derivatized galactomannan comprising the steps of:

(a) uniformly contacting substantially dry galactomannan or derivatized galactomannan with a liquid cleaving agent, wherein said substantially dry galactomannan or derivatized galactomannan has less than 15% water content by weight and the liquid cleaving agent is a hydrogen peroxide solution; and (b) mixing the galactomannan or derivatized galactomannan and the hydrogen peroxide solution, wherein the galactomannan or derivatized galactomannan is the major solid component by weight in the mixing step and the moisture content of the mixture during the mixing step is not more than 15% of the weight of the dry galactomannan or derivatized galactomannan, wherein said derivatized galactomannan is selected from the group consisting of hydroxypropylguar (HPG), carboxymethylguar (CMG), hydroxyethyl guar (HEG), carboxymethylhydroxypropyl guar (CMHPG), hydroxybutyl guar (HBG), cationic guar, hydrophobically modified guar (HMG) hydrophobically modified carboxymethylguar (HMCMG), hydrophobically modified hydroxyethylguar (HMHEG), hydrophobically modified hydroxypropylguar (HMHPG), hydrophobically modified carboxymethylhydroxypropylguar (HMCMHPG), hydrophobically modified hydroxybutyl guar (HMHBG), and hydrophobically modified cationic guar (HMCG).

3. The method according to claim 1 or 2, wherein the substantially dry galactomannan is a ground, dried endosperm of a seed containing galactomannan.

4. The method according to claim 1 or 2, wherein the substantially dry derivatized galactomannan is a ground, dried endosperm of a seed containing galactomannan that has been derivatized.

5. The method according to claim 1 or 2, wherein the substantially dry galactomannan or derivatized galactomannan has less than 10% water content by weight.

6. The method according to claim 5, wherein the mixture during the mixing step comprises 1–10 parts water relative to the dry galactomannan or derivatized galactomannan and the cleaving agent.

7. The method according to claim 1 or 2, wherein the mixture during the mixing step comprises 75–88 parts dry galactomannan or derivatized galactomannan, 11–13 parts water and 0.5–3.5 parts cleaving agent relative to each other.

8. The method according to claim 1 or 2, wherein the mixing is continued until less than 3–5 ppm of the cleaving agent remains in the mixture.

9. The method according to claim 1, wherein the cleaving agent is an oxidizing agent.

10. The method according to claim 1 or 2, wherein the mixing step is performed at a temperature in the range of 75–190° F.

11. The method according to claim 1 or 2, wherein the substantially dry galactomannan is from a source selected from the group consisting of guar seed endosperm, locust bean endosperm, tara seed endosperm and cassia toria endosperm.

12. The method according to claim 1 or 2, wherein the substantially dry derivatized galactomannan is HPG.

13. The method according to claim 12, wherein the HPG has an average number of moles of hydroxypropyl functional groups per anhydro sugar unit in the range of 0.2–0.8.

14. The method according to claim 13, wherein the HPG has an average number of moles of hydroxypropyl functional groups per anhydro sugar unit in the range of 0.2–0.6.

15. The method according to claim 1 or 2, wherein following the mixing step, the galactomannan or derivatized galactomannan has a weight average molecular weight between approximately 100,000 to 500,000 and a polydispersity index (PDI) in the range of 1–8.

16. The method according to claim 15, wherein following the mixing step, the galactomannan or derivatized galactomannan has a weight average molecular weight of approximately 150,000 to 225,000.

17. The method according to claim 1 or 2, wherein following the mixing step, the galactomannan or derivatized galactomannan has a PDI in the range of 2–6.

18. The method according to claim 17, wherein the galactomannan or derivatized galactomannan has a PDI in the range of 2–3.

19. The method according to claim 1 or 2, wherein the substantially dry derivatized galactomannan is from a source selected from the group consisting of guar seed endosperm, locust bean endosperm, tara seed endosperm and cassia toria endosperm that has been derivatized.

* * * * *